United States Patent [19]

Weil et al.

[11] Patent Number: 5,447,153
[45] Date of Patent: Sep. 5, 1995

[54] REAL-TIME WINDOW/LEVELING ON A RADIOGRAPHIC WORKSTATION

[75] Inventors: Richard Weil, Pittsford; David L. Modney, Fairport; Gary M. Diana, Henrietta; Steven P. Hiss, Fairport, all of N.Y.

[73] Assignee: Eastman Kodak Company, Rochester, N.Y.

[21] Appl. No.: 86,968

[22] Filed: Jul. 2, 1993

[51] Int. Cl.⁶ .................... A61B 5/00; A61B 5/05
[52] U.S. Cl. .................... 128/630; 128/653.1
[58] Field of Search ........ 364/413.13, 413.21; 395/128, 119; 358/111, 168, 164, 169; 378/99; 340/720; 345/129, 120, 115, 116, 133; 128/630, 653.1

[56] References Cited

U.S. PATENT DOCUMENTS

| | | | |
|---|---|---|---|
| 4,079,417 | 3/1978 | Scudder | 358/111 |
| 4,125,858 | 11/1978 | Hounsfield et al. | 358/82 |
| 4,438,495 | 3/1984 | Collins et al. | 364/414 |
| 4,595,949 | 6/1986 | Fenster et al. | 358/111 |
| 4,642,621 | 2/1987 | Nemoto et al. | 340/721 |
| 4,688,175 | 8/1987 | Kaneko et al. | 364/414 |
| 4,803,639 | 2/1989 | Steele et al. | 364/507 |
| 4,847,604 | 7/1989 | Doyle | 340/706 |
| 4,852,002 | 7/1989 | Klausz | 364/413.13 |
| 5,042,077 | 8/1991 | Burke | 382/51 |
| 5,046,027 | 9/1991 | Taaffe et al. | 364/521 |
| 5,058,176 | 10/1991 | Shimazaki et al. | 382/6 |
| 5,090,042 | 2/1992 | Bejjani et al. | 378/99 |
| 5,164,993 | 11/1992 | Capozzi et al. | 382/6 |
| 5,179,651 | 1/1993 | Taaffe et al. | 395/154 |
| 5,182,728 | 1/1993 | Shen et al. | 367/7 |
| 5,268,967 | 12/1993 | Jang et al. | 382/6 |
| 5,270,530 | 12/1993 | Godlewski et al. | 250/208.1 |

FOREIGN PATENT DOCUMENTS 0434208  6/1991  European Pat. Off.
2210533  6/1989  United Kingdom.

*Primary Examiner*—Gail O. Hayes
*Assistant Examiner*—Khai Tran
*Attorney, Agent, or Firm*—William F. Noval

[57] ABSTRACT

A radiographic image workstation for displaying radiographic images. The tonal characteristics of a displayed image can be changed through a real-time window/leveling technique.

5 Claims, 10 Drawing Sheets

REAL-TIME WINDOW/LEVELING ON A RADIOGRAPHIC WORKSTATION

FIELD OF THE INVENTION

This invention relates in general to a radiographic image systems and more particularly to a radiographic image workstation for displaying radiographic images and to a technique for changing the tonal characteristics of a displayed image through real-time window/leveling.

BACKGROUND OF THE INVENTION

Portable x-ray images are used to aid in assessing pathological changes and/or tube/line placement in critically ill patients in the U.S. Over 50% of portable examinations are performed in Critical Care Units (Intensive Care and Coronary Care). The remaining portable exams are performed on the medical or surgical floors or in the Emergency Room. Most patients in a Critical Care Unit have an x-ray procedure at least once per day. The primary portable exam type is AP (anterior-posterior) chest (80% of portable procedures) followed by abdomen and bone. The portable chest radiography market is expected to grow 20% in the United States over the next 5 years.

The technologist's problems in portable radiography are well known: maneuverability of the portable x-ray generator, carrying a large number of cassettes, x-ray tube positioning and determination of proper technique. The variability in positioning the x-ray tube results in different techniques between exams. This sometimes results in over or underexposure so that the radiologist requires an exam to be repeated. The average repeat rate is on the order of 5% to 10%.

The films that are generated while the patient is in a Critical Care Unit are kept in either the radiology department or in the unit. Typically, the most recent films are put on an alternator for easy access and review. Consultation about the procedure occurs where the films are located, requiring either the radiologist or the clinician to go to the films. At some institutions, a double film protocol is used in order to give both the radiologist and clinician easier access to the image.

As radiologists read portable exams, the most current film is compared to previous films to assess changes in the patient's condition. The variability in exposure with current film/screen combinations adds to the difficulty in the assessment of changes that are due to illness.

The clinicians in the Critical Care area often need immediate access to the portable films in order to check proper tube placement. They often "borrow" the film from the radiology department before the radiologist has a chance to read it. Sometimes these films are not returned and a report is not generated; thus the hospital has lost revenue for that exam.

As the population grows older, more people will be hospitalized and require surgery and critical care. Thus the number of portable examinations will increase; the need for better quality and faster portables will increase and hospitals will be in a position to justify the allocation of funds for new systems and additional generators specifically for portable procedures.

In the decades after the end of World War II, there were significant advances in phosphor materials. These advances made high speed electronic imaging possible. Research at Eastman Kodak Company, Rochester, N.Y., led to the first demonstration of a scanned storage phosphor radiographic system. This system was originally patented in 1975 and reissued as U.S. Pat. No. Reissue 31,847, reissued Mar. 12, 1985, to Luckey. In the storage phosphor system disclosed a storage phosphor is exposed to an x-ray image of an object, such as the body part of a patient, to record a latent x-ray image in the storage phosphor. The latent x-ray image is read out by stimulating the storage phosphor with relatively long wavelength stimulating radiation such as red or infrared light produced by a helium neon gas laser or diode laser. Upon stimulation, the storage phosphor releases emitted radiation of an intermediate wavelength, such as blue light, in proportion to the quantity of x-rays that were received. To produce a signal useful in electronic image processing the storage phosphor is scanned in a raster pattern by a laser beam deflected by an oscillating or rotating scanning mirror or hologon. The emitted radiation from the storage phosphor is reflected by a mirror light collector and detected by a photodetector such as a photomultiplier to produce an electronic x-ray image signal. Typically the storage phosphor is translated in a page scan direction past the laser beam which is repeatedly deflected in a line scan direction perpendicular to the page scan motion of the storage phosphor to form a scanning raster pattern of a matrix of pixels.

The x-ray image signal can then be viewed as a visual image produced by a softcopy display device, such as a video display (CRT, LCD) or a hardcopy display device, such as a x-ray film printer (laser printer, CRT printer, thermal printer).

There has been proposed in copending U.S. application Ser. No. 981,144, filed Nov. 24, 1992, inventors Godlewski et al., a quality control workstation (QCW) linked to a storage phosphor reader. The quality control workstation provides a radiology technologist with several functions, including checking images acquired from a storage phosphor reader (or other sources of digital radiographic images), correcting patient information and x-ray exam information, adjusting image parameters, such as image orientation and window width and leveling, routing acceptable exams and images to designated destinations (such as remote high resolution workstations, magnetic or optical archival image storage, radiographic laser, CRT, thermal printers).

The QCW image processing software uses four Look Up Tables (LUTs) in order to transform the image data (which is in digital form) and present it to the user on a video display. The four LUTs are:

| | |
|---|---|
| the gamma lut | (12 bit in, 8 bit out) |
| the window/level lut | (12 bit in, 12 bit out) |
| the preference lut | (12 bit in, 12 bit out) |
| the crt lut | (12 bits in/8 bits out) |

The preference lut is used to give the image an overall appearance, i.e. a "regular" look (white bones), black bone, and high contrast. The gamma lut is used to correct for the non-linear response of the display device (i.e. the video display tube). The window/level lut is used to select a region of interest within the image, where level adjusts the brightness of the image, and window adjusts the contrast of the image.

The QCW image processing software previously performed the window/level function as follows:

The user requested that a specific image be displayed, for the purpose of verifying image quality; poor images could be windowed and leveled.

To change the window width and level values for the displayed image, the user would push the left mouse button, while simultaneously moving the mouse (the position of the mouse cursor is sensed, in order to derive the window and level values, with the x axis representing level, and the y axis representing window). This cycle took approximately one to two seconds per re-display of the image with the most recently sensed window and level values. To accomplish this, the image processing software would cascade the tonescale, window/level, and gamma LUTs, creating the crt lut. The data representing the currently displayed image would then be mapped to display values through the crt lut. At this point the reprocessed image would be displayed on the video display tube. The three LUTs are cascaded to form the crt LUT, which the image pixels are mapped through, in order to give the desired result on the video display tube.

Such a software intensive window/leveling technique has been found to provide slow feedback to the workstation user. As a result, the user desired values for window and level were often difficult to achieve. The slowness of response is due partially to the fact that software runs on the control computer and shares computing time with all the other applications that run on the computer. These other applications are chores that the computer must maintain, such as keeping track of keyboard input and reading data from disc.

There is thus a problem in the display of a radiographic image on a workstation to rapidly effect tonal changes in the image by window/leveling inputs by a user of the workstation.

SUMMARY OF THE INVENTION

According to the present invention, there is provided a solution to this problem in the prior art. According to an aspect of the present invention, there is provided a quality control workstation having real-time window/-leveling for displayed radiographic images, comprising:
 a memory for storing digital radiographic images;
 a video display;
 a hardware color lut memory;
 a user input device; and
 a digital computer, wherein real-time window/-leveling is effected by a user, (a) using the user input device to display a selected radiographic image from said memory, (b) using the user input device, changing the window width and level of the displayed image until a satisfactory image is obtained, each change in window width and level being effected by cascading a preference lut, a window/-level lut and a gamma lut into a crt lut by means of software routines of said digital computer, thereafter the crt lut is loaded into the hardware color lut memory, while reserving the color cells used in display borders, scroll bars, and other non-display areas, the radiographic image from said memory being processed by said hardware color lut memory for display on said display.

DESCRIPTION OF THE PREFERRED EMBODIMENTS

Figure 1:
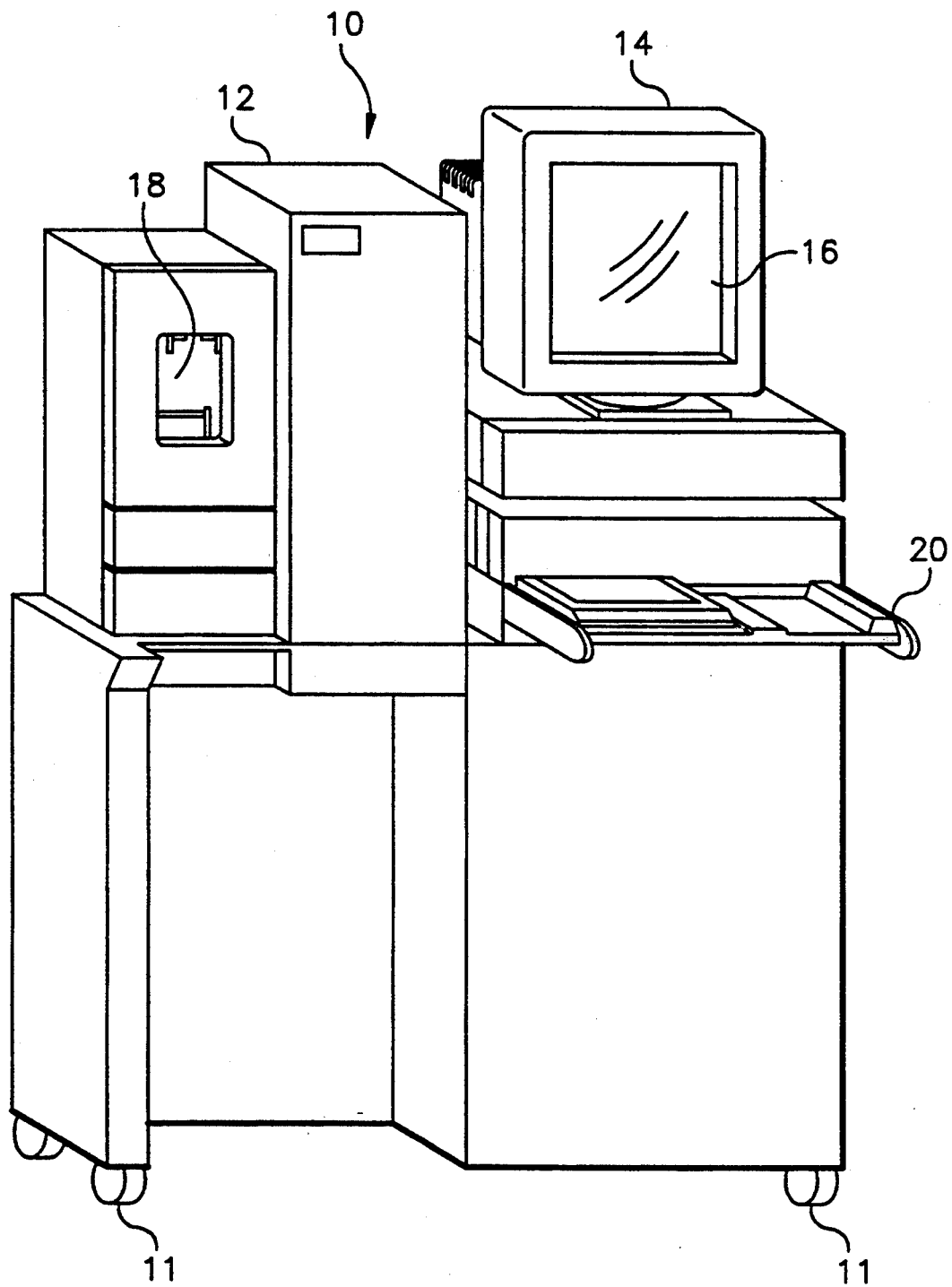
FIG. 1 is a perspective view of a storage phosphor reader.

Referring now to FIG. 1, there is shown a storage phosphor reader 10. Reader 10 is mounted on casters 12 for easy portability in a radiology environment. Reader 10 includes a multiunit housing 12 housing the components of storage phosphor reader 10 and a video monitor 14 having a touch screen 16 supported on housing 12. Housing 12 also includes a bar code reader docking station 18 for docking a hand held bar code reader and for transferring data from the hand held bar code reader to storage phosphor reader 10. Reader 10 includes storage phosphor cassette load platform 20 which receives cassettes containing storage phosphor plates which are to be read or erased by reader 10.

In general, storage phosphor reader 10 processes images captured on a storage phosphor plate using conventional radiographic equipment. Reader 10 then scans the storage phosphor plate and converts the latent x-ray image therein into an electrical x-ray image signal which can be viewed on monitor 14. The scanned image is then delivered to a receiving device (such as a quality control station, laser printer or archival device) for image processing, image enhancement, viewing, printing and/or storage. The storage phosphor reader 10 is operated using touch screen 16 which also displays the image. The storage phosphor plates which are used to hold the unexposed x-ray images are mounted in standard size x-ray cassettes of different sizes. These storage phosphor plates can be erased and reused repeatedly. The optional hand held bar code reader can be used to collect exam information which is transferred to the storage phosphor reader 10 when it is mounted in station 18. The exam information is then associated with the scanned images.

In general, the storage phosphor reader is usable in the storage phosphor patient identification system disclosed in commonly assigned U.S. patent application Ser. No. 963,036, filed Oct. 19, 1992, inventor Good et al. As disclosed in that patent application, the storage phosphor patient identification system is as follows:

When a radiology technologist receives a request for an x-ray examination of a patient, the technologist exposes a body part of the patient to an x-ray which is stored as a latent x-ray image in the storage phosphor plate of a storage phosphor cassette. Several images may be taken at this time. Using the optional portable bar code reader the technologist scans the patient identification bar code label and the label on the storage phosphor cassette. Exam related information can be scanned from a bar code chart that is usually attached to the portable x-ray generator. Such information includes body part type, x-ray exposure conditions, position of patient and the like.

The image is now captured by the technologist performing the x-ray exam using the cassette containing the storage phosphor plate from which the bar code label was scanned. When the x-ray exam is complete the technologist takes the storage phosphor cassette to storage phosphor reader 10 to be processed. If the optional bar code reader is used, the technologist transfers the patient identification and exam information by inserting the bar code reader into the bar code reader station 18 on the front of reader 10. The scanned information is then transferred to the control system of the storage phosphor reader 10. The technologist then loads the cassette containing the exposed storage phosphor plate into reader 10 by loading on load platform 20. Scanning is initiated when the technologist presses a start button on touch screen 16.

Inside storage phosphor reader 10 the storage phosphor plate is extracted from the cassette and scanned with a laser light. As the plate is scanned, the image appears on touch screen 16 as it is being scanned. After the scanning is complete the image is sent to a receiving device where it can be tonescaled, enhanced, viewed, printed and/or stored. After the storage phosphor plate has been completely scanned it is erased by exposure to light which removes any remnants of the image. The storage phosphor reader 10 then places the storage phosphor plate back into its cassette. The technologist can now remove the cassette from reader 10 to be reused for another exam.

Figure 2:
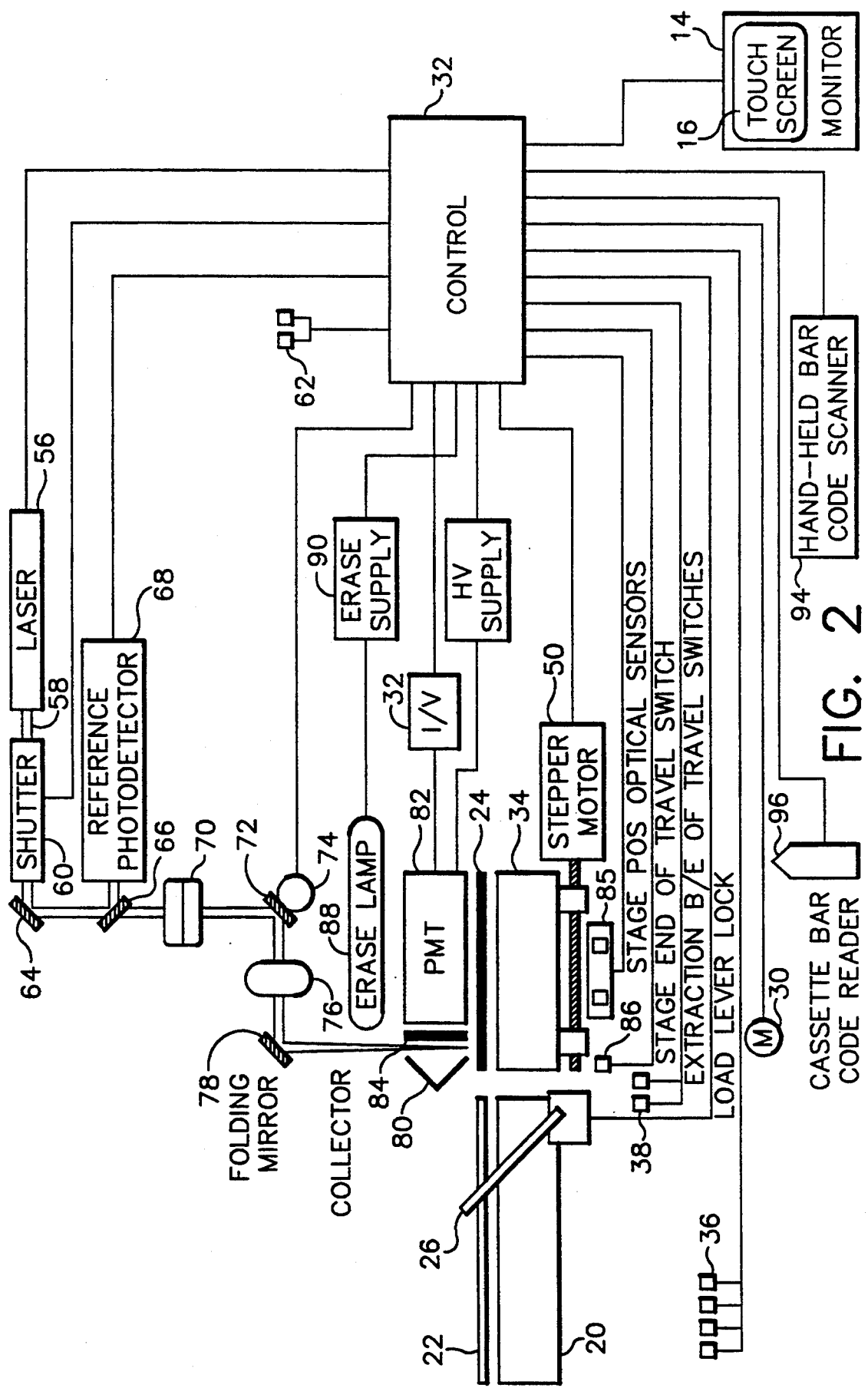
FIGS. 2 and 3 are respectively a partially diagrammatic, partially schematic view and a perspective view of the components of the storage phosphor reader of FIG. 1.
Figure 3:
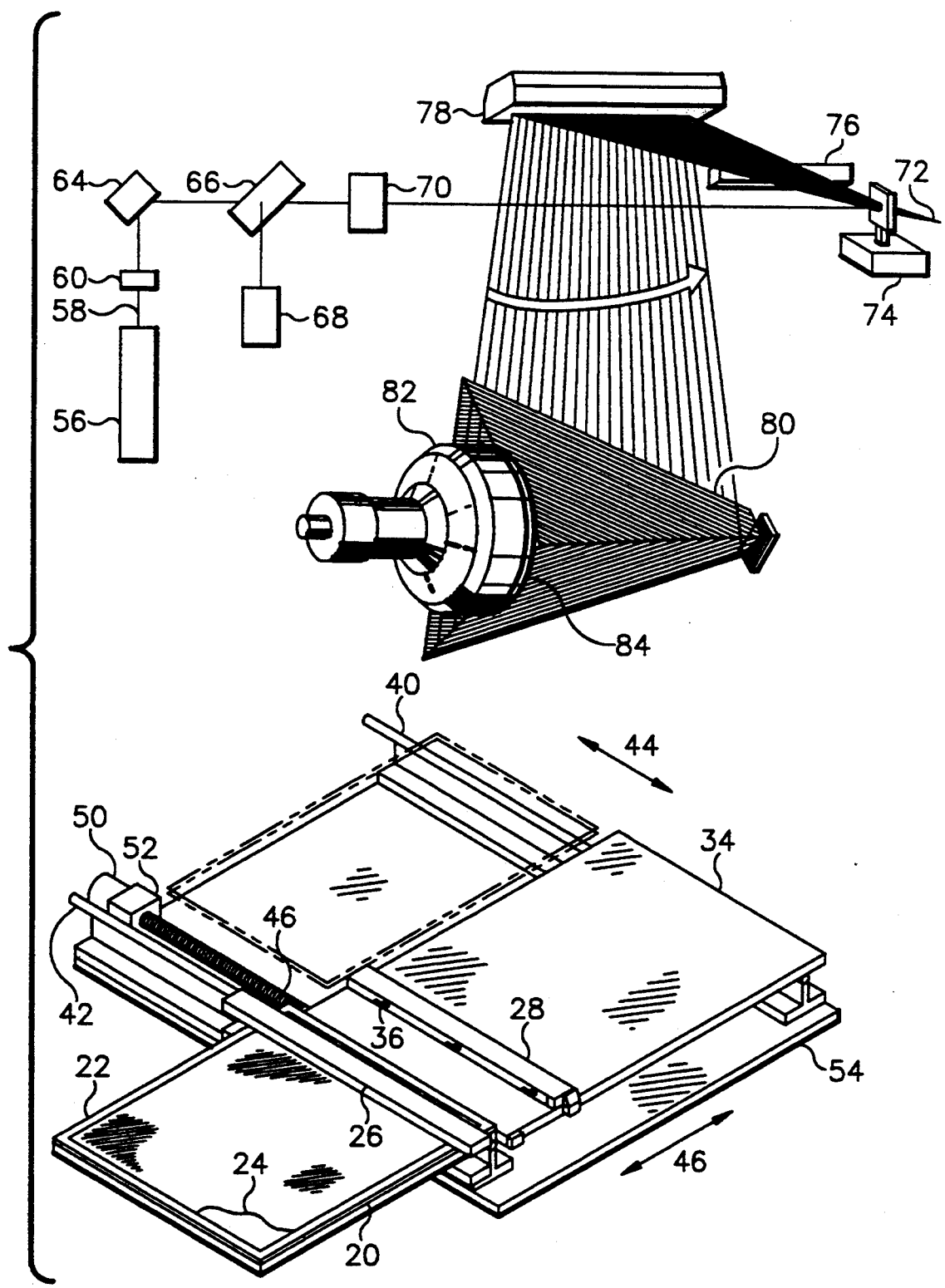

Referring now to FIGS. 2 and 3 there will be described in greater detail a preferred embodiment of storage phosphor reader 10. As shown, a storage phosphor cassette 22 containing a storage phosphor plate 24 is loaded on cassette load platform 20. Load lever 26 is rotated to clamp cassette 22 in place and to latch the cassette 22 to permit extraction of storage phosphor plate 24 therefrom. Storage phosphor plate 24 is extracted from cassette 22 by extraction device 28 (FIG. 3) which is actuated by extraction motor 30 under software control from control 32. Control 32 includes standard computer components such as a microprocessor, a magnetic disk drive for storing images, software applications and computer operating system and input and output devices to communicate with the components of reader 10. Such microcomputer systems are well known in the art and will not be described in detail herein.

Extraction device 28 is slidably mounted on translation stage 34 and includes hooks 36 which engage storage phosphor plate 24. Extraction device 28 extracts storage phosphor plate 24 from cassette 22 onto translation stage 34. As the storage phosphor plate 22 is loaded onto stage 34 it passes over plate size detecting switches 36 which detect the plate size and communicate this information to control 32. There are sufficient plate size detectors 36 to detect the different plate sizes that can be processed by reader 10. The beginning and end of travel of extraction mechanism 28 are sensed by extraction begin and end travel switches 38 connected to control 32.

Translation stage 34 is slidably mounted on rails 40 and 42 for movement in opposite directions 44 which are perpendicular to the directions 46 of loading and unloading of plate 24 relative to translation stage 34. Translation stage 34 is driven by a screw drive mechanism 48 actuated by stepper motor 50 mounted on block 52. Rails 40 and 42 are supported by frame member 54 of reader 10.

The laser scanning components will now be described. Reader 10 includes a laser 56 (such as a helium neon gas laser) for stimulation of storage phosphor plate 24. Laser 56 produces a laser beam 58 which passes through a shutter 60. Shutter 60 is controlled by digital signals received from control 32. Shutter 60 closes with activation of cover interlock switches 62 which detect closure of the housing 12 covers.

Beam 58 is reflected off mirror 64 and passes through beam splitter 66 which directs a portion of the laser beam 58 to reference photodetector 68. Following the beam splitter 66 laser beam 58 passes through collimator 70. The collimated laser beam is deflected by an oscillating scan mirror 72 driven by galvanometer 74 under the control of control 32. Scan mirror 72 provides the line scan raster motion of the laser beam 58. Galvanometer 74 drives mirror 72 with a constant angular velocity.

An f-theta lens 76 produces a flat field of focus and constant linear velocity at the plane of storage phosphor plate 24. Folding mirror 78 directs the laser beam through light collector 80 onto storage phosphor plate 24. Collector 80 may be of the type disclosed in commonly assigned U.S. Pat. No. 5,151,592, issued Sep. 29, 1992, inventors Boutet et al. The stimulating light of laser beam 58 causes the storage phosphor in plate 24 to emit light (blue) which is a function of the x-ray image stored in plate 24. Collector 80 directs this emitted light onto photomultiplier tube (PMT) 82. A filter 84 in front of the face of PMT 82 blocks the scattered stimulating laser light and passes the light emitted by storage phosphor plate 24. Once a storage phosphor plate 24 is on translation stage 34 a scan is begun. Movement of translation stage 34 in the direction of arrow 44 is under software control of control 32. Control 32 sends commands to stepper motor 50 to initiate a scan, to start translation stage 34, to start galvanometer 74 and to turn on PMT 82. From the home position of stage 34 the control 32 counts stepper motor 50 steps to the point where the storage phosphor plate 24 is under collector 80. At this point acquisition of the latent x-ray image on storage phosphor plate 24 begins. At the end of the scan (determined by the number of scan lines for the appropriate storage phosphor plate size), PMT 82 and galvanometer 74 are turned off and translation stage 34 is returned to the home position which is determined by one of the stage position optical sensors 85. A stage end of travel switch 86 is located just beyond the position of optical sensors 84 to prevent damage in case of failure of optical sensors 84.

Immediately after translation stage 34 reaches the home position, erase lamp 88 is turned on by actuation of erase power supply 90 under software control from control 32. Following a predetermined erase time (such as 30 seconds) erase lamp 88 is turned off and extraction mechanism 28 returns storage phosphor plate 24 in the direction of arrow 46 to storage phosphor cassette 22. When the extraction mechanism 28 trips the extraction end of travel switch 38, the lock for load lever 26 is released. The storage phosphor reader user can now rotate load lever 26 and remove cassette 22 from loading platform 20.

During the scan of storage phosphor plate 24 an emitted x-ray light image is converted by PMT 82 into an x-ray electrical current signal. This signal is converted to a voltage by amplifier 92. As described in greater detail in commonly assigned U.S. patent application Ser. No. 965,657, filed Oct. 23, 1992, inventor S. Dhurjaty, entitled "Noise Reduction in a Storage Phosphor Data Acquisition System", laser noise which is present in the x-ray image signal produced by PMT 82 is corrected by subtracting a reference signal detected by reference photodetector 68. The corrected digital signal is corrected for the light collection signature of light collector 80 by a correction lookup table in control 32. The correction lookup table is loaded during calibration of reader 10 when it is initially set up.

Patient identification and x-ray examination information are downloaded into reader 10 from a hand held bar code scanner 94 positioned in station 18 of reader 10. As each storage phosphor plate 24 is extracted from its cassette 22 cassette bar code reader 96 reads the bar code on plate 24. The image data and corresponding patient and exam information are correlated by control 32.

The storage phosphor reader 10 of FIG. 1 can be part of a critical care system made up of hardware and software that allows radiology technologists to (1) capture images onto a standard cassette which contains a storage phosphor plate using the sites conventional x-ray image capture methods; (2) convert those images into electronic images using the storage phosphor reader 10; (3) using a quality control workstation correct any erroneous patient information, exam information, and, if necessary, the x-ray image look; (4) print the image and its text label on an x-ray laser printer; and (5) enter patient information into the patient database and generate a bar code label for the patient identification. Optionally, the critical care system also allows a requesting physician or radiologist to view the image on a high resolution workstation, such as the Personal Display System supplied by Vortech, of Richardson, Tex. The system can also be expanded to allow optional permanent archiving of x-ray exams on optical disk where it can be retrieved for later viewing or reprinting.

Figure 4:
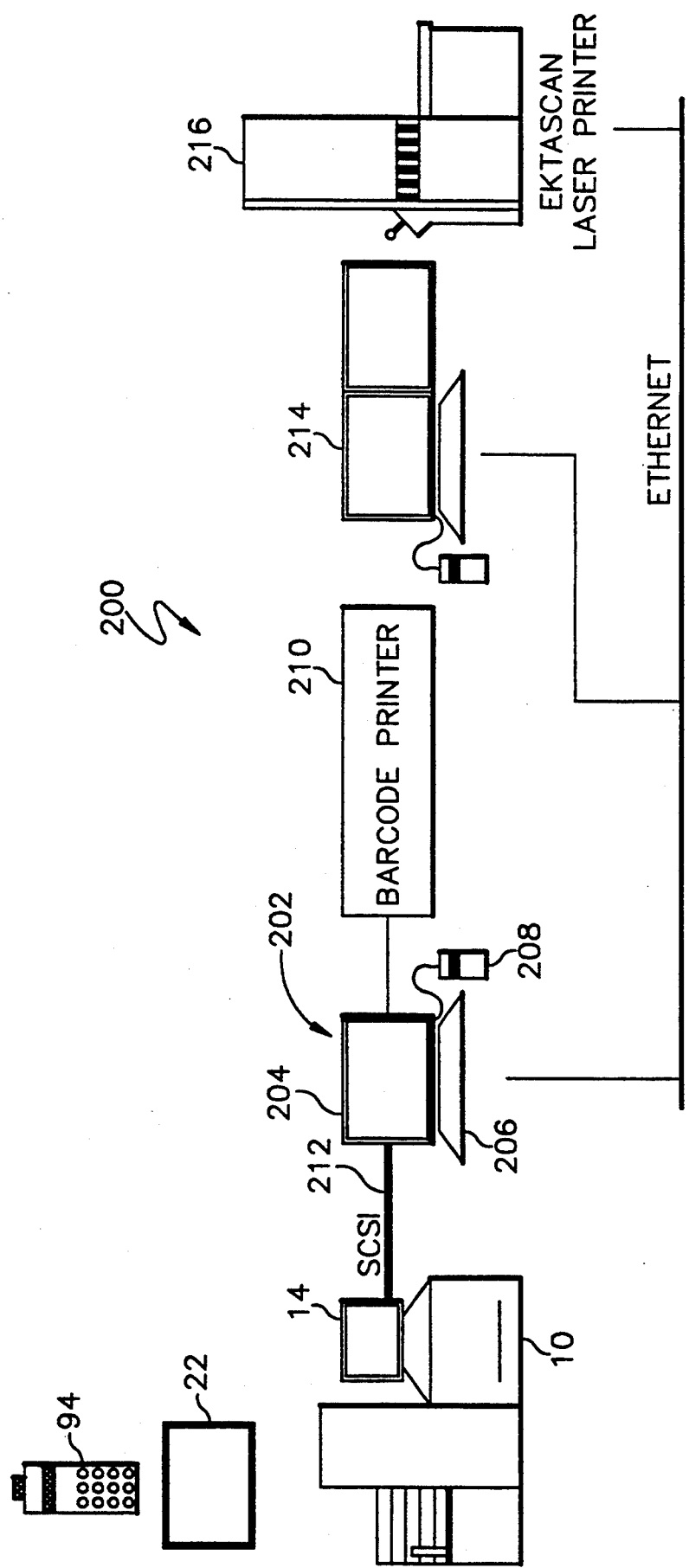
FIG. 4 is a schematic diagram of a critical care system incorporating the present invention.

Referring to FIG. 4, there is shown a diagrammatic view of a critical care system incorporating an embodiment of the present invention. As shown, critical care system 200 includes storage phosphor reader 10 having a control and viewing monitor 14. Reader 10 accepts storage phosphor x-ray cassette 22 for converting an x-ray image in the cassette storage phosphor into a digital x-ray image. A hand-held bar code scanner 94 is provided to download patient ID and exam information into reader 10. System 200 also includes quality control and data entry workstation 202 which includes a high resolution monitor 204, a data entry keyboard 206, and a mouse 208. An optional bar code printer 210 is linked to quality control workstation 202. Storage phosphor reader 10 communicates with work station 202 by means of a communication channel, such as a SCSI communications link 212.

Link 212 passes a raw digital x-ray image from storage phosphor reader 10 to quality control workstation 202. Workstation 202 allows a technologist to view the x-ray image. It also functions as the database server, upon which the demographic database resides. Workstation 202 will be described in greater detail hereinafter, but, in general, provides an interactive data entry interface for the technologist and prints patient ID bar code labels on bar code printer 210. Using the quality control workstation 202, the radiology technologist can modify the image presentation (orientation, tonescale, edge enhancement) and patient or examination information prior to approving the image and routing it to its next destination. The technologist can also modify or add routing information for a patient for a single image.

Quality control workstation 202 can be used in a pass-through mode or a manual mode. In pass-through mode, x-ray exams are processed at the workstation 202 and then routed directly to other destinations, such as high resolution PDS 214, or laser printer 216 (such as a Kodak Ektascan Laser Printer). In manual mode, a user must verify the x-ray image from reader 210 and patient and exam information before releasing it to its destination. The image enhancement which allows for proper display of the images for diagnostic purposes is performed by adaptive unsharp masking processing and tonescaling. The tonescaling algorithms are preferably those described in U.S. patent application Ser. No. 797,615, filed Nov. 25, 1991, inventors Capozzi and Schaetzing, entitled "Method and Apparatus for Automatic Tonescale Generation in Digital Radiographic Images" and U.S. patent application Ser. No. 906,191, filed Jun. 29, 1992, inventors Jang and Schaetzing, entitled "Method for Automatic Foreground and Background Detection in Digital Radiographic Images".

Quality control workstation 202 is linked to high resolution personal display system 214 and laser printer 216 by means of a communication link, such as an Ethernet link. This link may be a hard wire or optical linelink, or a wireless link, or a satellite link.

Figure 15:
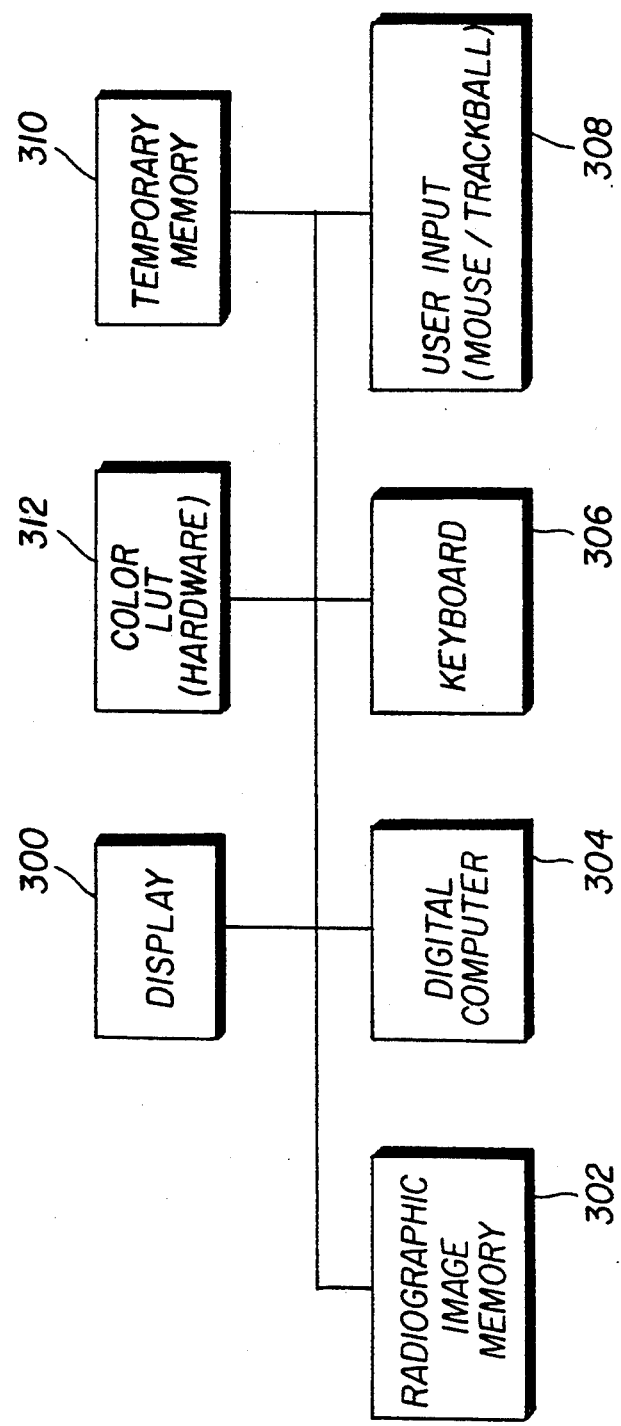
FIG. 15 is a block diagram of the functional components of the display station of FIG. 4.

In general, quality control workstation QCW 202 has sufficient resident memory and fixed disk storage to meet the following requirements: (1) storage of a predetermined number of x-ray exams, (2) patient database, (3) exam information (such as exposure conditions, body part, patient position, etc.), (4) preference information, i.e., image processing parameters for exam types, (5) error and transaction logs, (6) an operating system, (7) application software. As shown in block diagram in FIG. 15, QCW 202 includes a display 300 for displaying radiographic images, patient and exam information, control bars, menus, etc. QCW 202 also includes radiographic image memory 302 (such as a magnetic or optical disk drive), a digital computer 304 (such as a microprocessor), keyboard 306, user input device 308 (such as a mouse or trackball), temporary memory 310 (such as RAM), and a color LUT (such as a video RAM).

In general, the quality control workstation 202 provides the radiology technologist with the following functions.

1. Check images acquired from storage phosphor reader 10.
2. Correct patient information and x-ray exam information.
3. Adjust image parameters, such as image orientation and window width and level (after they have been automatically enhanced using tonescaling and unsharp masking techniques in workstation 202).
4. Route an acceptable exam or image (automatically or by specification) to one or more destinations such as an x-ray laser printer, a viewing station (PDS) or image archive. In manual mode, the exam must be approved (released) by the technologist before it will be automatically routed to a specified or default destination. Preferably, the image data is transmitted to its destination in a ACR-NEMA (America College of Radiology-National Electrical Manufacturers Association) file which contains the processed image data and ACR-NEMA header (containing patient information and exam information) and applicable lookup tables.

5. Automatically process exams and route them directly to the destinations. This is called pass-through mode.
6. Enter patient information (demographics) into the local (i.e., critical care system) patient database, or access the system patient database.
7. Generate bar code labels for each newly acquired patient identification number and, as necessary, new bar code labels required for the exam data collection card and, optionally, radiology technologist identification.

Figure 5:
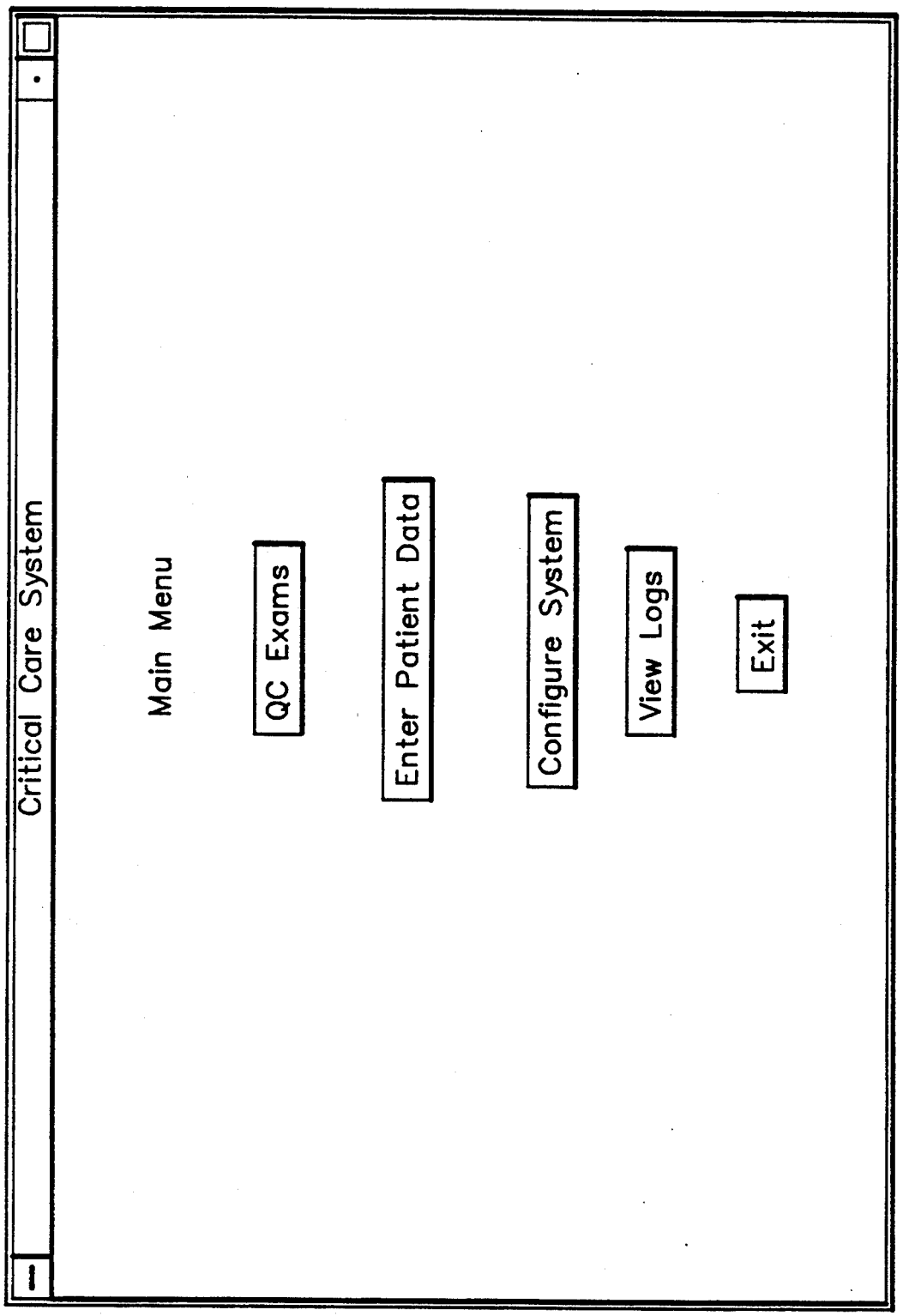
FIGS. 5–7 are screens depicting some of the functions of a quality control station of the system of FIG. 4.

Certain of the functions of quality control workstation 202 will now be described in greater detail with reference to FIGS. 5-7 which depict the screens showing the menus and operations that can be effected by means of a pointer on the screen controlled by a mouse. As shown in FIG. 5, the main menu is used to select the quality control function to be used. Main menu shown in FIG. 5 includes the selectable functions QC exams, enter patient data, configure system, view logs, exit.

Figure 6:
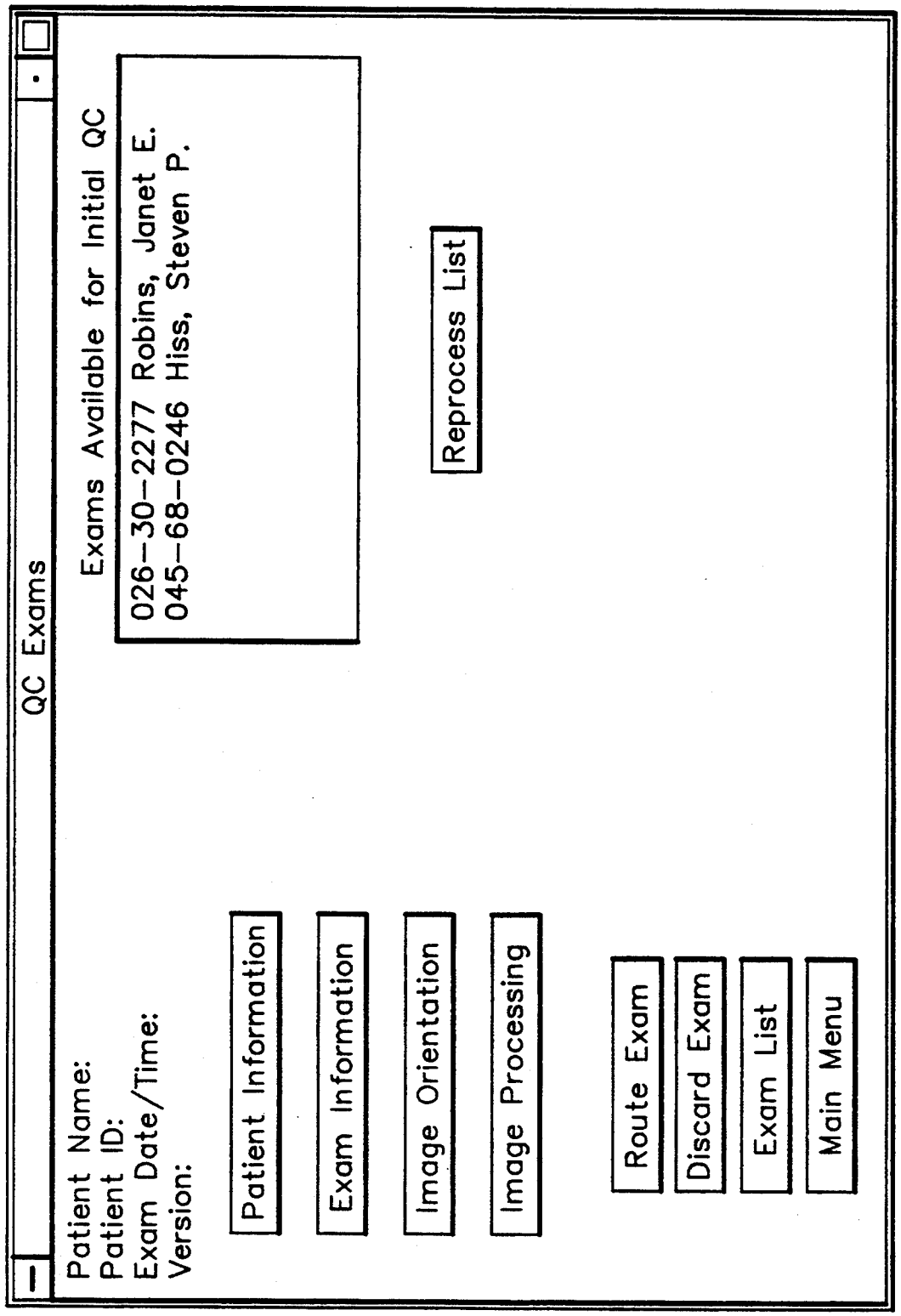

FIG. 6 depicts the QC exams screen with the exams (images) which are available for initial quality control processing. Two exams are listed for ROBBINS and HISS. This screen also indicates several other function buttons which can be selected (by means of keyboard 306 or user input device 308), i.e., a reprocess list, patient information, exam information, image orientation, image processing, route exam, discard exam, exam list, and main menu.

Figure 7:
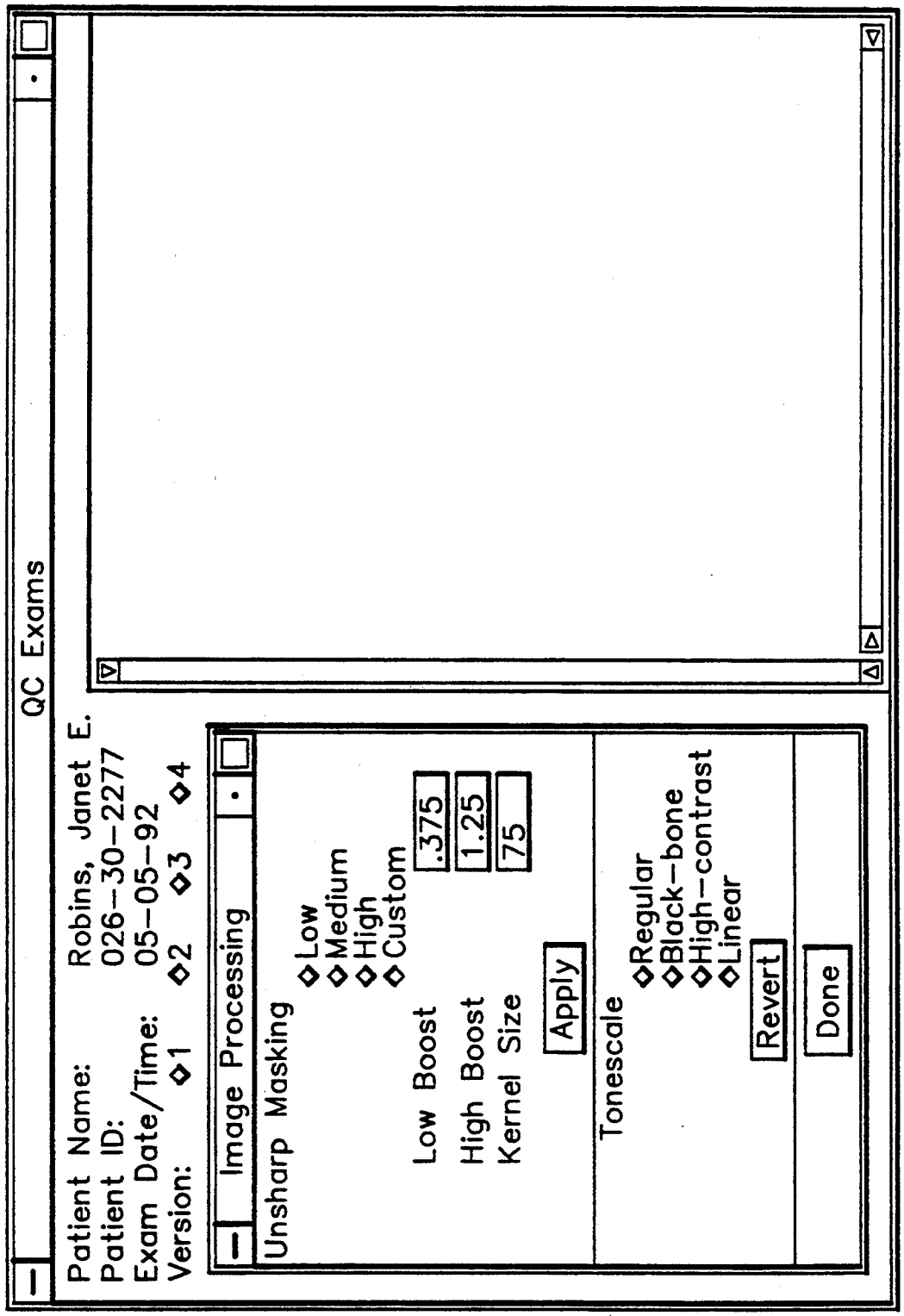

Referring to FIG. 7, there is shown the QC exam screen with image processing window, which allows the user to change image processing parameters for the currently displayed version. This window appears when an exam is selected for reprocessing, or when the image processing button is selected.

As shown in the image processing window on the left, image processing parameters include unsharp masking parameters and tonescale parameters. In general, unsharp masking, or edge enhancement, is applied to an image to produce an image with lines or edges that are more clearly defined. This is done by first "blurring" a copy of the image through convolution. Convolution is a mathematical process which multiplies the image by a kernel. The size of the kernel determines the number of weight factors and, therefore, the extent to which the image is blurred. The blurred image is then subtracted from the original image to create an "edges only" image. High and low boost factors are applied selectively to the "edges only" image and added back into the original image which produces the unsharp mask image.

Referring again to FIG. 7, in the image processing window a user can select low, medium, high or custom unsharp masking, low boost, high boost, and kernel size. As shown, for custom unsharp masking the low boost factor is selected as 0.375, the high boost factor is selected as 1.25, and the kernel size is selected as 75 (75×75 matrix).

Figure 8:
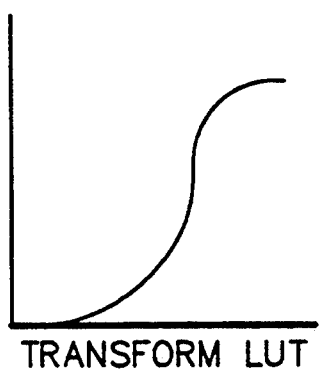
FIGS. 8–11 are graphical views useful in illustrating tonescale image processing.

The tonescale selections available to a user are indicated under the tonescale heading as regular, blackbone, high contrast, or linear. These tonescale look-up tables are applicable to the version selected to be displayed on the display area of the screen of FIG. 7. When raw image data is received by quality control workstation 202 from storage phosphor reader 10, a tonescale transformation look-up table is generated according to the computed radiography image processing algorithms disclosed in the above referenced U.S. patent application Ser. Nos. 797,615 and 906,191. The transform look-up-table (LUT) 8 provides the optimal mapping of the raw image data to film using exam type, histogram, etc., information. The transform LUT can be modified at workstation 202 by the user, if the original LUT failed to produce an optimal image look. A typical graphical representation of a tonescale transform LUT as derived above is shown in FIG. 8.

Figure 9:
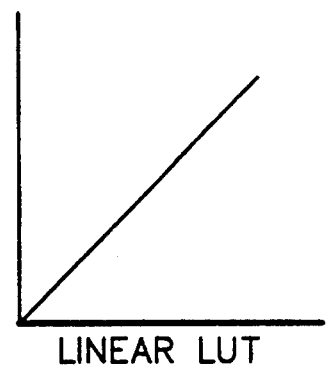
Figure 10:
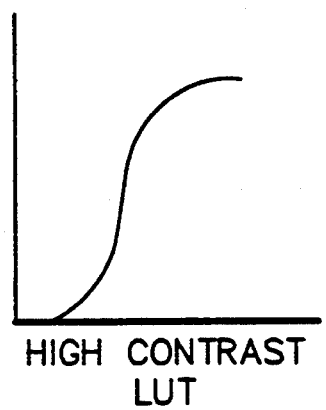
Figure 11:
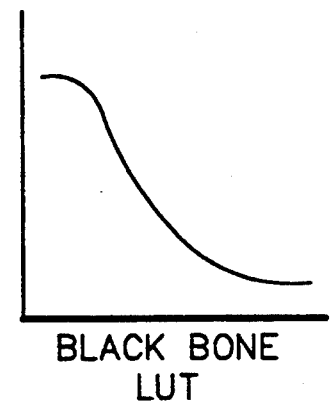
Figure 12:
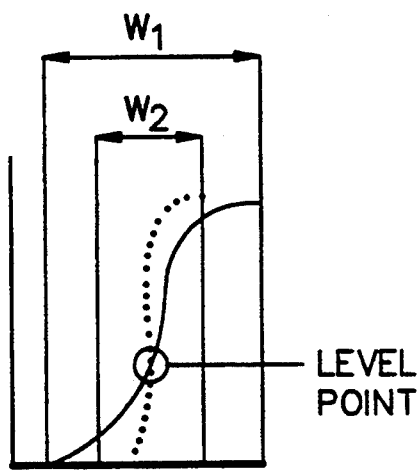
FIGS. 12–13 are diagrammatic views useful in illustrating window width and level image processing.
Figure 13:
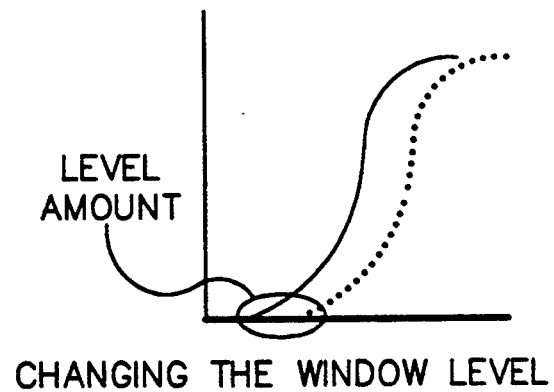
Figure 14:
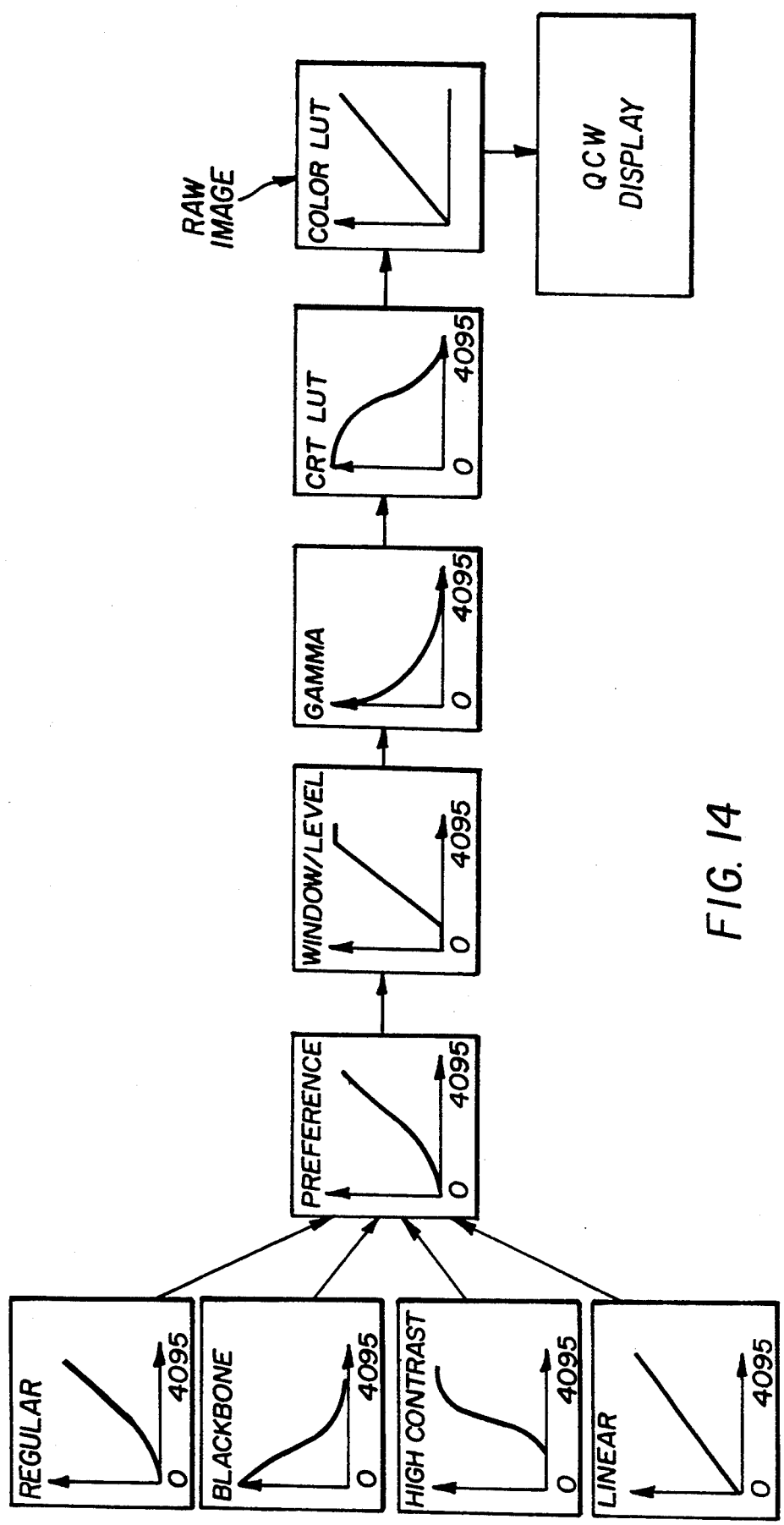
FIG. 14 is a graphical view useful in illustrating.

The tonescale buttons shown in the image processing window of FIG. 14 allow the user to perform the following tonescaling operations on the transform LUT:

1. Replace the transform LUT 8 by a linear LUT as shown in FIG. 9.
2. Replace the transform LUT 8 by a high contrast LUT, as shown in FIG. 10.
3. Replace the transform LUT by a blackbone LUT as shown in FIG. 11.
4. Change window width or/and window level. Window width and level changes are actually multiplications and additions to the transform LUT. These changes (also called deltas) are stored in the image (version) header so that the user can determine what changes have been made to the original LUT based on these values and parameters. FIGS. 12 and 13 illustrate the effect of changing window width and window level on a transform LUT. FIG. 7 is provided with vertical and horizontal scroll bars which allow changing of window width by moving a cursor up and down the vertical scroll bar and which allow changing window level by moving a cursor left and right on the horizontal scroll bar. Alternatively, movement of a mouse or trackball (308) in X (left-right) and Y (up-down) directions can effect changes in window width and level simultaneously.
5. Revert to the original LUT based on exam type by selecting the revert button.
6. Change the exam type so that the LUT for that exam type is applied.

According to the present invention, QCW 202 functions to effect real-time window/leveling of a displayed radiographic image. This function allows the user to make changes to the window and level parameters, and see immediate results on the currently displayed computed radiography image. Originally, the QCW 202 used a method for window/leveling an image which provided poor (slow) feedback to the user; as a result, the user-desired values for window and level were often difficult to achieve. The technique of the invention provides a continuous visual response as the user manipulates the input device (either a mouse or trackball). Along with the speed increase, the QCW 202 also uses a procedure to avoid the alteration of display colors already in use by the application.

Real-time window/leveling of images requires the following four LUTs which are cascaded in software in addition to a color LUT which resides in hardware.

| | |
|---|---|
| the gamma lut | (12 bit in, 8 bit out) |
| the window/level lut | (12 bit in, 12 bit out) |
| the preference lut | (12 bit in, 12 bit out) |
| the crt lut | (12 bits in/8 bits out) |
| the color lut | (8 bits in/8 bits out) |

The preference lut is used to give the image an overall appearance, i.e. a "regular" look (the transform lut or white bones), black bone, high contrast. The gamma lut is used to correct for the non-linear response of the QCW 202 video display screen. The window/level lut is used to select a region of interest within the displayed radiographic image, where level adjusts the brightness of the image, and window adjusts the contrast.

Along with these LUTs, an additional parameter is required: the number of color cells used by the application program. The number of color cells used parameter informs the image processing software as to how many of the entries in the color LUT are already in use. In the QCW application, this value is usually less than ten.

Another lookup table, one stored in the display hardware is also required for real-time window window/-leveling: the color lut. Like the crt lut, it is 8 bits wide and 256 bytes long. It is used by the display hardware to map pixel input values to video display tube output pixels. An exemplary device is the Bt 459 RAM DAC ™ supplied by Brooktree Corp., San Diego, Calif. This device combines a high speed RAM with DACs (digital-to-analog converters).

The number of color cells used parameter informs the image processing software about the elements (and their locations) in the hardware color map. In order to avoid changing the color and/or intensity of the QCW window borders, scroll bars, etc. (see e.g., FIG. 7), these color map locations should not be altered. The window/leveling of the displayed image, along with the scroll bars, etc., can be distracting to the user.

According to the present invention, real-time window/leveling of a displayed radiographic image is as follows:

The user of QCW 202 requested that a specific image from radiographic image memory 302 be displayed on display 300, for the purpose of verifying image quality; poor images could be windowed and leveled.

The user of QCW 202 then holds down the left mouse button of user input device 308; while holding the mouse button and simultaneously moving the mouse, the user would see the image on the display 300, with the last sampled window/level values applied to it. The difference with this scheme, is that the time between the user's mouse movement, and processing/redisplay of the image is very short. The time is so short as to appear tightly coupled to the user's mouse movements. This results in faster and easier window/leveling of images in the QCW system.

Once the user has achieved the correct window/level values and is satisfied with the displayed image, he/she discontinues pressing on the left mouse button. At this point, as illustrated in FIG. 14, the image processing software in digital computer 304 recalculates the window/level lut, then cascades the gamma, tonescale, and window/level LUTs into the crt LUT. Now, instead of mapping the radiographic image data from memory 302 through the LUT, the crt LUT is loaded into the color lut, which is store din hardware 312. In this way, the pixels displayed for the current image are manipulated via the display hardware 312, as proposed to doing the same operation in hardware.

The reason for this last action is due to the fact that the colormap LUT manipulates the image in 8 bit space only, and to correctly calculate the image data for display, the image processing code must cascade the three LUT (in doing, accomplishing a 12 bit to 12 bit, 12 bit to 8 bit conversion), which results in a different (more accurate) final LUT to run the image data through. Once this operation is complete, the hardware color map is restored to its original form. This avoids the alteration of display colors already in used by the application.

What is claimed is:

1. Digital image processing apparatus comprising:
   a memory for storing digital medical images and image processing look-up tables, including a window/level look-up table (lut) having selectively variable parameters and a gamma lut;
   an image display having an image display area and a non-image display area;
   a hardware color lut memory coupled between said memory and said image display;
   a digital control means, including a user input device for inputting commands to said digital control for controlling said memory, said image display, and said hardware color lut memory; and
   a) in a first mode, in response to a command through said user input device to display a medical image from said memory on said image display, to cascade said window/level lut and said gamma lut into an image display lut; to store said image display lut in said hardware color lut memory, while reserving color cells used in said non-image area of said image display; and to display said medical image from said memory in the image area of said image display after said image is passed through said hardware color lut memory; and
   (b) in a second mode, in response to a command through said user input device to selectively change the parameters of said window/level lut, to change said window/level lut as a function of said changed parameters, to cascade said changed window/level lut with said gamma lut into a changed image display lut; to store said changed image display lut in said hardware color lut memory; and to redisplay said medical image in said image display area of said image display, with said changed window/level parameters, without changing the displayed values of said non-image display areas.

2. The apparatus of claim 1 wherein said digital memory stores digital radiographic images from a digital radiographic source, such as a diagnostic scanner, a storage phosphor reader, a radiographic film digitizer.

3. The apparatus of claim 2 wherein said image processing look-up tables stored in said memory include a preference lut; and wherein, in said first and second modes, said digital control cascades said preference lut, said window/level lut, and said gamma lut into said image display lut.

4. The apparatus of claim 3 wherein said preference lut stored in said memory includes a normal white-bone lut, a black-bone lut, and a high-contrast lut.

5. The apparatus of claim 1 wherein said digital control includes a digital computer.

* * * * *